Feb. 15, 1927.  
W. WESTON  
1,617,973  
BREAKFAST FOOD AND PROCESS OF PRODUCING SAME  
Filed Aug. 11, 1926
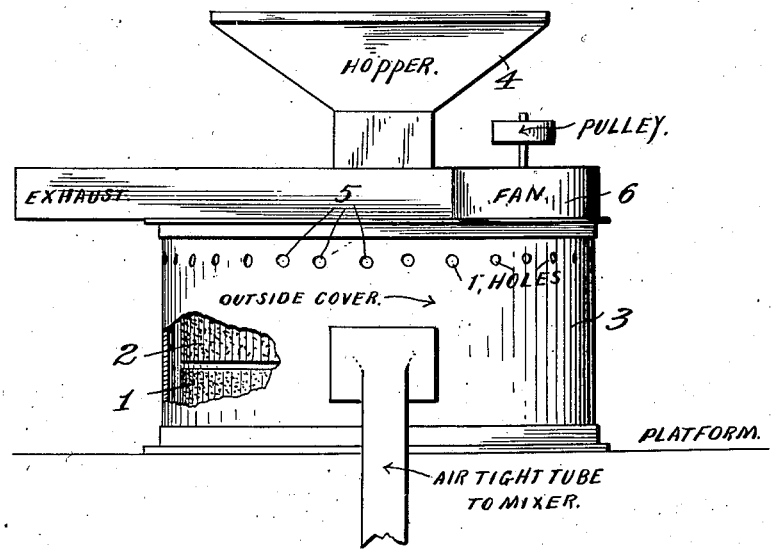
Witness:
Jasles Hutchinson
Inventor:
William Weston,
By J. C. Hutchinson Jr.
Attorney.

Patented Feb. 15, 1927.

1,617,973

UNITED STATES PATENT OFFICE.

WILLIAM WESTON, OF COLUMBIA, SOUTH CAROLINA.

BREAKFAST FOOD AND PROCESS OF PRODUCING SAME.

Application filed August 11, 1926. Serial No. 128,715.

This invention relates to food products and to a process for producing the same.

One of the important objects of this invention is to provide a readily digested food having a maximum amount of those essentials necessary to normal nutrition and embodying the requisite amounts of fats, carbohydrates, proteins, mineral salts and vitamins.

Normal nutrition requires a sufficient amount of fats, carbohydrates, proteins, mineral salts and vitamins. In order to obtain a sufficient amount and variety of proteins, which are dependent for their value upon the quality and variety of the amino acids therein contained or to be derived therefrom, it is necessary that they (the proteins) be derived from a variety of sources. Grains, such as yellow corn, wheat, oats and rice are among the most important, inasmuch as each of these grains possesses one or more specific proteids or amino acids not found elsewhere. It is another object of this invention to employ grains selected from regions whose soils are especially rich in mineral elements. I have found that grains, particularly the oats and wheat employed, when selected from blue grass regions (i. e. regions where blue grass grows naturally) have an exceptionally high content of the essential mineral salts, vitamins and amino acids.

Another object of this invention is to provide a novel process for converting the grains into an edible breakfast food, which retains all of the food values of the grains, including the vitamins, and which food product is capable of being stored for long periods without deterioration.

In the present process I employ grains, preferably all of which and essentially certain of which are grown in "blue grass" regions. By this expression I denote the portions of several States, notably Kentucky, where blue grass grows naturally. In order to grow blue grass, not only must the soil be right but certain climatic conditions, as noted below, must also be right. The vitamin contents of grains grown in the regions stated will be found to be high, and a sufficient variety as well as sufficient quantity of the vitamins will be assured by the use of grains from the regions indicated.

In carrying out my process, one of the steps employed is a grinding operation and this is preferably done between stone burrs encased so as to exclude and prevent air currents from carrying away valuable constituents. Such a construction is disclosed in the single figure on the drawing accompanying and forming a part of this application.

In carrying out my process for the production of the breakfast food, which consists of yellow corn, wheat, oats and seed rice, in the proportions of 15% yellow corn, 35% whole seed wheat, 25% whole seed oats and 25% whole seed rice.

I preferably first thoroughly dry the grains by a suitable dehydrating process, in order that all weevils or foreign animal life may be destroyed, but principally for the purpose of preventing deterioration in the food from fermentation, when the food is placed upon the market. This is done by the use of a high degree of heat (say 300° F.), air excluded, for five minutes. After all animal matter and moisture have been removed from the grains they are individually ground, preferably between stone burrs, 1 and 2, which are enclosed in a case 3, carrying an ordinary form of feed hopper 4. This case 3 is provided with a plurality of air holes 5 so that the exhaust fan 6 may receive sufficient air to prevent a vacuum in the case and will permit said exhaust to draw off any dust particles from the grain as it is fed between the burrs.

This grinding operation, particularly with the yellow corn, which is selected chiefly because of its high content of vitamin A is carried on very slowly, because this particular vitamin deteriorates rapidly when subjected to a high degree of heat in the presence of air, for a long period of time. Consequently it is of the utmost importance that the yellow corn be milled very slowly, so as to prevent the generation of any material amount of heat. The corn is preferably ground to pass a screen having about 10 meshes per linear inch.

I select seed rice from Louisiana not only for the purpose of obtaining the laxative bran and in order to obtain vitamin B, contained in the inner cuticle. which is just beneath the hull, but because the rice grown there contains a high amount of iodine, a necessary mineral, and one that is usually absent or deficient in our foods. Hulled and polished rice does not contain the proper portion of iodine and has no vitamin B. Vitamin B is not only essential for the growth and development of the child but is also necessary for the maintenace of normal health and well being in the adult, while the bran secured assists in maintaining a normal and healthy peristaltic action of the intestines. Vitamin B., as contained in the inner cuticle of the rice is especially potent. The seed rice must be ground intact (i. e. with the hulls thereon) in order to preserve the maximum quanity of iodine and secure the vitamin B. This is then carefully sifted, excluding air currents. The inner cuticle passes through the sieve into a receptacle, leaving chaff and grain kernel. A current of air is then turned on and excess chaff blown out. Finally the inner cuticle of rice and kernel are mixed and further ground if desired, preferably to pass a screen having 10 meshes to the inch.

The wheat and oats are preferably dehulled before grinding, and all of the wheat and oats, except the hull removed, is ground preferably to pass a screen having 10 meshes to the inch. The wheat and oats are preferably ground together.

It is enough to say that these grains, if indiscriminately selected will be rather poor in some of the most essential mineral elements required for normal nutrition and I therefore, preferably select all of the them, and in any case the wheat and oats at least, from the blue grass regions where the soil is rich in the important mineral elements required for normal nutrition. The normal rainfall in the blue grass regions will be at least about 28 to 30 inches during the growing season, and the normal sunshine will average 19 to 20 days out of each 30 days during the growing season.

Corn grown in the regions referred to and with the normal rainfall and sunshine, will show approximately the following composition:

| | Per cent. |
|---|---|
| Total ash | 1.38 |
| P₂O₅ | .43 |
| K₂O | .39 |
| CaO | .002 |
| MgO | 0.16 |
| Total N | 1.43 |
| Fe | .0029 |
| Na | 0.020 |
| S | 0.006 |

Wheat grown in the regions referred to will have (after removal of the hulls) approximately the following compositions:

| | Per cent. |
|---|---|
| Total ash | 1.97 |
| P₂O₅ | 1.03 |
| K₂O | .55 |
| CaO | .06 |
| MgO | .23 |
| Total N | 1.96 |
| Fe | .006 |
| Na | 0.06 |
| S | 0.0042 |

Oats grown under these conditions will have (after removal of the hulls) approximately the following composition:

| | Per cent. |
|---|---|
| Total ash | 2.20 |
| P₂O₅ | 0.34 |
| K₂O | 0.52 |
| CaO | 0.04 |
| MgO | 0.23 |
| Total N | 0.46 |
| Fe | .0038 |
| Na | 0.08 |
| S | 0.04 |

Rice (disregarding the chaff which is removed) grown under the specified conditions, will have approximately the following composition:

| | Per cent. |
|---|---|
| Total ash | 1.15 |
| P₂O₅ | 0.65 |
| Calcium | 0.55 |
| Fat | 1.96 |
| Protein | 8.02 |

A mixture of these (prepared as described herein) will contain sufficient quantities of the desired ash constituents, vitamins (except vitamin C) and the following proteids and amino acids: zein, glutelin, gliadin, glutenin, lysine, cystine, glycine, alanine, valene, phenelalanine, aspartic acid, glutanic acid, serine, tyrosine, histidine, argenine, tryptophane, hordein, leucosin, and edestin, all of which substances are essential constituents of the final product.

After the grains have been dehydrated and ground in the manner specified, they are mixed together in the proportions named, and packed for shipment. This food is then prepared very much in the manner of oatmeal, or other similar breakfast foods, namely, by boiling so as to be served as a gruel or mush.

It has been demonstrated by carefully conducted tests made under my supervision, that children suffering from various forms of malnutrition, can be greatly benefited by feeding them this food, along with other diet commonly used for children.

Other careful tests conducted by me have demonstrated a practical elimination of the symptoms of gout, in persons afflicted therewith, by eating this food.

It has been effectively determined by extensive feeding experiments that when this food, consisting of wheat, yellow corn, oats and rice, treated in the manner specified, is eaten that vitamin C is synthesized, thus the human body is supplied with all known vitamins.

The present case is in part a continuation of my copending case Ser. No. 72,175, filed November 30, 1925.

What I claim is:

1. A food composition containing as its essential constituents ground yellow corn, seed wheat from which the hull is removed, oats from which the hull is removed and seed rice from which the chaff but not the inner cuticle is removed, all ground to a granular condition, the wheat and oats at least, having the high ash and protein content characteristic of grains grown on blue grass land.

2. A breakfast food comprising ground yellow corn, wheat, oats and seed rice, the wheat and oats having the high ash and protein constituents normal to those grown in regions whose soil naturally grows blue grass.

3. A food product comprising 15% whole grain yellow corn, 35% whole grain wheat with hull removed, 25% whole grain oats with hull removed and 25% whole grain seed rice with chaff only removed, the wheat and oats having the high ash and protein constituents normal to those grown in regions whose soil naturally grows blue grass.

4. A process which comprises grinding to a granular state, yellow corn, grinding wheat and oats with the hulls removed therefrom, whole seed rice with only the chaff removed, the oats and wheat being grown in regions where blue grass grows naturally, and during such grinding operations excluding air currents and maintaining a relatively low degree of heat, thereby preserving the essential vitamin content.

5. A breakfast food consisting of four grains including yellow corn, wheat and oats grown in regions whose soil naturally grows blue grass and a fourth grain having a high iodine content, all of said grains being ground and combined for the purposes set forth.

In testimony whereof I affix my signature.

WILLIAM WESTON.